United States Patent
Lee et al.

(10) Patent No.: US 8,602,624 B2
(45) Date of Patent: Dec. 10, 2013

(54) BACKLIGHT UNIT AND DISPLAY DEVICE HAVING THE SAME

(75) Inventors: Sang Hoon Lee, Seoul (KR); Hae Hyung Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 301 days.

(21) Appl. No.: 13/070,133

(22) Filed: Mar. 23, 2011

(65) Prior Publication Data

US 2011/0267837 A1    Nov. 3, 2011

(30) Foreign Application Priority Data

May 3, 2010    (KR) .................. 10-2010-0041398

(51) Int. Cl.
*F21V 7/22*    (2006.01)
(52) U.S. Cl.
USPC ........... 362/606; 362/294; 362/373; 362/608; 362/632
(58) Field of Classification Search
USPC .................. 362/606, 608, 294, 373, 632
See application file for complete search history.

(56) References Cited

U.S. PATENT DOCUMENTS

| | | | |
|---|---|---|---|
| 7,488,104 B2 * | 2/2009 | Hamada et al. | 362/616 |
| 7,766,534 B2 * | 8/2010 | Iwasaki | 362/632 |
| 2006/0072344 A1 * | 4/2006 | Kim et al. | 362/632 |
| 2006/0262571 A1 * | 11/2006 | Chen | 362/632 |
| 2007/0211184 A1 | 9/2007 | Erchak et al. | |
| 2008/0304288 A1 | 12/2008 | Iwasaki | |

FOREIGN PATENT DOCUMENTS

| | | |
|---|---|---|
| JP | 2004-4581 A | 1/2004 |
| KR | 10-2003-0052980 A | 6/2003 |
| KR | 10-2006-0012917 A | 2/2006 |
| KR | 10-2006-0099365 A | 9/2006 |
| KR | 10-2009-0120556 A | 11/2009 |
| WO | WO 2009/099547 A2 | 8/2009 |

* cited by examiner

*Primary Examiner* — Stephen F Husar
*Assistant Examiner* — James Cranson, Jr.
(74) *Attorney, Agent, or Firm* — Birch, Stewart, Kolasch & Birch, LLP

(57) ABSTRACT

A backlight unit is disclosed. The backlight unit includes a light emitting device array including a plurality of light emitting devices, an optical sheet to transmit light emitted from the light emitting device array, a frame to support the light emitting device array and the optical sheet, and at least two heat dissipating members placed on the frame in an emission direction of light from the light emitting device array. The heat dissipating member disposed at the center has a greater area than the heat dissipating member disposed at the perimeter.

20 Claims, 6 Drawing Sheets

BACKLIGHT UNIT AND DISPLAY DEVICE HAVING THE SAME

This application claims the benefit of Korean Patent Application No. 10-2010-0041398, filed on May 3, 2010, which is hereby incorporated by reference as if fully set forth herein.

BACKGROUND

The embodiment relates to a backlight unit, and more particularly, to a heat dissipating structure of a backlight unit.

Liquid Crystal Displays (LCDs), demand for which is increasing rapidly in recent years, is a display device in which the quantity of light introduced from an external source is controlled using liquid crystals between a Thin Film Transistor (TFT) substrate and a color filter substrate, enabling display of an image.

Such an LCD is not a self-emissive device and thus, requires a backlight unit that irradiates a liquid crystal panel.

Cold Cathode Fluorescent Lamps (CCFLs) having a rod shape or Light Emitting Diodes (LEDs) having a dot shape have conventionally been used as a light emitting device for a backlight unit.

However, since CCFLs cannot provide uniform brightness although they have high brightness, long lifespan and lower heat emission than incandescent bulbs, a backlight unit that uses LEDs as a light emitting device is widely used.

LEDs are light emitting elements using conductive group III-V or group II-VI compound semiconductors and can emit light of various colors, i.e. red, green, blue, white and ultraviolet light. Moreover, LEDs can emit white light with high efficiency through use of fluorescent materials or color combination.

SUMMARY

Accordingly, the embodiment is directed to a backlight unit and a display device having the same that substantially obviate one or more problems due to limitations and disadvantages of the related art.

The embodiment is to improve heat dissipation characteristics of a backlight unit.

Additional advantages and features of the embodiment will be set forth in part in the description which follows and in part will become apparent to those having ordinary skill in the art upon examination of the following or may be learned from practice of the embodiment. The advantages of the embodiment may be realized and attained by the structure particularly pointed out in the written description and claims hereof as well as the appended drawings.

To achieve these advantages and in accordance with the purpose of the embodiment, as embodied and broadly described herein, a backlight unit includes a light emitting device array including a plurality of light emitting devices, an optical sheet to transmit light emitted from the light emitting device array, a frame to support the light emitting device array and the optical sheet, and at least two heat dissipating members placed on the frame in an emission direction of light from the light emitting device array, wherein the heat dissipating member disposed at the center has a greater area than the heat dissipating member disposed at the perimeter.

The heat dissipating members may include heat pipes.

The heat dissipating member at the center may have a greater width than the heat dissipating member at the perimeter.

The heat dissipating member at the center may have a greater length than the heat dissipating member at the perimeter.

The heat dissipating members may have a trapezoidal shape such that a side thereof close to the light emitting device array has a greater width than an opposite side thereof distant from the light emitting device array.

The trapezoidal heat dissipating member disposed at the center may have a greater width than the trapezoidal heat dissipating member disposed at the perimeter.

The trapezoidal heat dissipating member disposed at the center may have a greater length than the trapezoidal heat dissipating member disposed at the perimeter.

The heat dissipating member at the center may have a greater area than the heat dissipating member at the perimeter.

The heat dissipating members may be arranged on a front surface or a rear surface of the frame.

The backlight unit may further include a light guide plate to transmit the light projected from the light emitting device array to the optical sheet.

In accordance with another aspect of the embodiment, a backlight unit includes a light emitting device array including a plurality of light emitting devices, a light guide plate and an optical sheet to transmit light emitted from the light emitting device array, a frame to support the light emitting device array, the light guide plate and the optical sheet, and at least two heat dissipating members placed on the frame in an emission direction of light from the light emitting device array, wherein the heat dissipating member disposed at the center has a greater area than the heat dissipating member disposed at the perimeter.

In accordance with a further aspect of the embodiment, a backlight unit includes light emitting device arrays disposed respectively at opposing sides, an optical sheet to transmit light emitted from the light emitting device arrays, a frame to support the light emitting device arrays and the optical sheet, and symmetric two groups of heat dissipating members placed in an emission direction of light from the respective light emitting device arrays, wherein the heat dissipating member disposed at the center has a greater area than the heat dissipating member disposed at the perimeter.

Each of the light emitting device arrays may include a plurality of light emitting devices and each group of heat dissipating members may include at least two heat dissipating members.

Of the heat dissipating members of each group, the heat dissipating member at the center may have a greater width than the heat dissipating member at the perimeter.

Of the heat dissipating members of each group, the heat dissipating member at the center may have a greater length than the heat dissipating member at the perimeter.

The heat dissipating members of each group may have a trapezoidal shape such that a side thereof close to the light emitting device array has a greater width than a side thereof distant from the light emitting device array.

The trapezoidal heat dissipating member disposed at the center may have a greater width than the trapezoidal heat dissipating member disposed at the perimeter.

It is to be understood that both the foregoing general description and the following detailed description of the embodiment are exemplary and explanatory and are intended to provide further explanation of the invention as claimed.

BRIEF DESCRIPTION OF THE DRAWINGS

The accompanying drawings, which are included to provide a further understanding of the embodiment and are incorporated in and constitute a part of this application, illustrate embodiment(s) of the embodiment and together with the description serve to explain the principle of the embodiment. In the drawings.

DETAILED DESCRIPTION OF THE EMBODIMENTS

Figure 1:
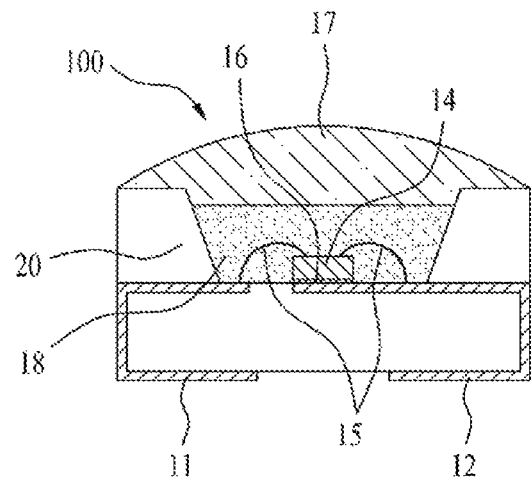
FIG. 1 is a view illustrating an embodiment of a light emitting diode package.

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" over the other substrate, layer (or film), region, pad, or pattern, or one or more intervening layers may also be present. Such a position of the layer has been described with reference to the drawings.

The thickness and size of each layer shown in the drawings may be exaggerated, omitted or schematically drawn for the purpose of convenience or clarity. In addition, the size of elements does not utterly reflect an actual size.

Hereinafter, a light emitting device and a method of manufacturing the same according to the embodiment will be described with reference to accompanying drawings.

Figure 2A:
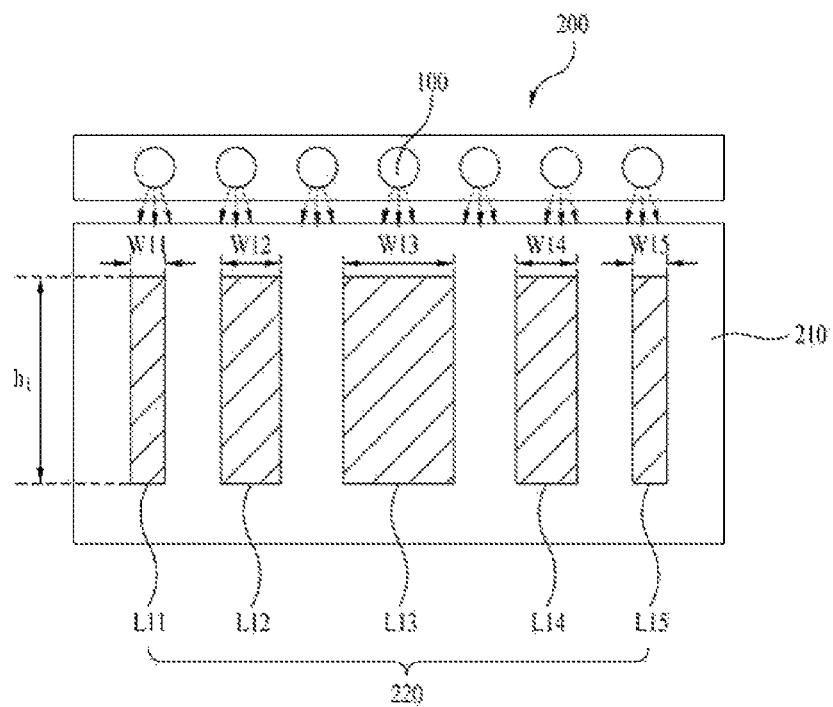
FIGS. 2A to 5 are views illustrating embodiments of a backlight unit.
Figure 2B:
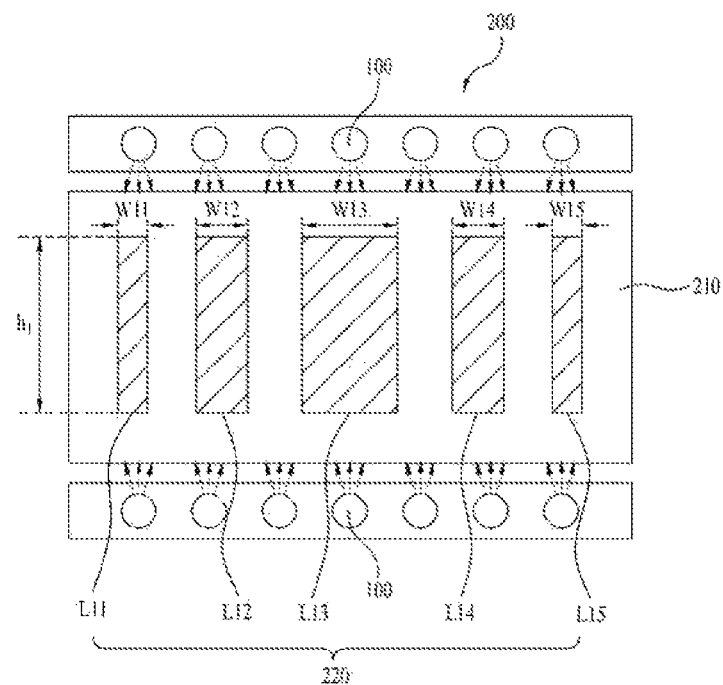

FIG. 1 is a view illustrating an embodiment of a light emitting diode package, FIGS. 2A and 2B are views illustrating different embodiments of a backlight unit. Hereinafter, the embodiments of the backlight unit according to the embodiment will be described with reference to FIGS. 1, 2A and 2B.

As illustrated, the backlight unit 200 includes a light emitting device 100 and heat dissipating members 220 placed on a frame 210. Here, the heat dissipating members 220 may take the form of heat pipes and the frame 210 may be made of high strength metal, and for example, may be made of stainless steel having high corrosion resistance.

The backlight unit, in which light emitting elements, such as light emitting diodes, are arranged, tend to convert only about 20% of consumed energy into light and the remaining 80% is lost as heat based on optical characteristics of light emitting diodes, thereby disadvantageously increasing the interior temperature thereof. The temperature increase of the backlight unit may deteriorate the overall performance of the backlight unit.

Furthermore, the backlight unit using light emitting diodes may suffer from deterioration in efficiency due to heat emission after extended use. Consequently, excessive increase in heat emission caused after extended use may reduce lifespan of the backlight unit.

Accordingly, to prevent reduction in lifespan due to extended use and excessive heat emission, the backlight unit may need a heat dissipating structure. To this end, in the present embodiment, the heat dissipating members 220 in the form of heat pipes are provided.

With the trend towards increasingly slim backlight units, a thickness of the frame 210 may be in a range of 0.1~0.2 mm. In addition, the size of the frame 210 may be changed according to the size of a screen of a display device, such as a liquid crystal display usable with the backlight unit. In consideration of the screen of the display device, the frame 210 may have a rectangular shape.

A supporting member may be mounted on the frame 210 and serve to support, e.g., the light emitting device 100.

Preferably, the light emitting device 100 is a light emitting diode package including light emitting diodes. Specifically, the light emitting diodes may emit light of various colors, such as red, green, blue, white and ultraviolet light, and may emit white light with high efficiency through use of fluorescent materials or combination of colors, thereby being advantageous for use in the backlight unit.

As illustrated in FIG. 1, the light emitting diode package 100 includes a light emitting diode 14 disposed on a package body 20. The light emitting diode 14 is electrically connected to first and second electrodes 11 and 12 disposed on the package body 20.

The light emitting diode 14 may be fixed to the package body 20 through a bonding layer 16. Although not illustrated, a heat dissipating pad may be disposed to absorb and dissipate heat emitted from the light emitting diode 14.

The package body 20 may be made of a silicone material, a synthetic resin material or a metallic material. A ramp is formed around the light emitting diode package 100, thus serving to improve light extraction efficiency.

The light emitting diode 14 may be electrically connected to the first and second electrodes 11 and 12 by either flip chips or die bonding, in addition to using bonding wires 15 as illustrated.

The first electrode 11 and the second electrode 12 are electrically isolated of each other and serve to apply power to the light emitting diode 14. In addition, the first electrode 11 and the second electrode 12 may function to reflect light emitted from the light emitting diode 14 so as to increase illumination efficiency and also, may function to dissipate heat generated from the light emitting diode 14.

A filler 18 may be disposed to surround the light emitting diode 14, thus serving to protect the light emitting diode 14. The filler 18 contains a fluorescent substance so as to change the wavelength of light emitted from the light emitting diode 14.

The light emitting diode package 100 further includes a lens 17. The lens 17 may be placed on or surround the filler 18, or may be formed on the package body 20 so as to cover the package body 20. The lens 17 may serve to change a path of light emitted from the light emitting diode 14. The lens 17 may be omitted as occasion demands.

In the above-described configuration, a light emitting device array, which is comprised of a plurality of light emitting diode packages 100 fixed on a printed circuit board, may be fixed to a distal end of the frame 210. This is equally applicable to the following embodiments.

In the case of the light emitting diode backlight unit, heat emitted from the light emitting diodes may be concentrated on the center of the backlight unit. Thus, it is necessary to increase the area of the heat dissipating member 220 disposed at the center of the frame 210. More specifically, assuming that five dissipating members $L_{11}$, $L_{12}$, $L_{13}$, $L_{14}$ and $L_{15}$ are provided, the center dissipating member $L_{13}$ has the greatest area.

Here, the term "center" refers to an approximately middle location in a horizontal or vertical direction of the frame 210, and the term "perimeter" means an edge region of the frame 210.

In the embodiment, the heat dissipating members 220 may be heat pipes. Such a heat pipe may be configured by filling a conductive pipe with a highly thermally conductive medium.

To maximize heat dissipation effects, the heat dissipating members 220 may be brought into contact with the printed circuit board on which the light emitting diode package 100 is fixed. The frame 210 may be disposed with a hole at a distal end of the heat dissipating member 220, so as to enable dissipation of heat from the interior of the backlight unit. In this case, it will be appreciated that the distal end of the heat dissipating member 220 is at a location far away from the light emitting diode package 100.

More specifically, the heat dissipating members 220 are arranged parallel to the direction of light emitted from the light emitting diode package 100, and the area of the respective heat dissipating members 220 decreases from the center to the perimeter of the frame 210.

The area of the respective heat dissipating members 220 is determined based on a width thereof. For example, the heat dissipating member 220 disposed at the center of the frame 210 may have the greatest width, and the width of the respective heat dissipating members 220 may gradually decrease toward the perimeter of the frame 210.

In addition, the width of the respective heat dissipating members 220 may decrease toward the perimeter in proportion to a distance from the center of the frame 210.

More specifically, the five heat dissipating members $L_{11}$, $L_{12}$, $L_{13}$, $L_{14}$ and $L_{15}$ have the same length or height $h_1$, but have different widths $W_{11}$, $W_{12}$, $W_{13}$, $W_{14}$ and $W_{15}$ respectively, such that the center heat dissipating member $L_{13}$ has the greatest width $W_{13}$ and the outermost heat dissipating members $L_{11}$ and $L_{15}$ have the smallest width $W_{11}$ and $W_{15}$.

In this case, the width $W_{11}$ of the outermost heat dissipating member may $L_{11}$ be in a range of ⅓~⅔ the width $W_{13}$ of the center heat dissipating member $L_{13}$. If the width $W_{11}$ or $W_{15}$ is less than ⅓ the width $W_{13}$, heat is not sufficiently dissipated at the perimeter. Also, if the width $W_{11}$ or $W_{15}$ is ⅔ or more the width $W_{13}$, effects obtained by providing the center heat dissipating member with a thick thickness are inconsequential.

Although FIG. 2A illustrates seven light emitting diode packages 100 and five heat dissipating members 220, actually, a greater number of light emitting diode packages 110 and heat dissipating members 220 may be disposed.

The heat dissipating members 220 are preferably made of a highly thermally conductive material. For example, the heat dissipating members 220 may be made of aluminum (Al) or copper (Cu). In addition, the heat dissipating members 220 may be made of gold (Au) or silver (Ag) when taking no thought of costs.

The embodiment illustrated in FIG. 2B is basically identical to the embodiment illustrated in FIG. 2A, but has a difference in that a pair of arrays of light emitting diode packages 100 is disposed at two opposing sides of the frame 210.

Figure 3A:
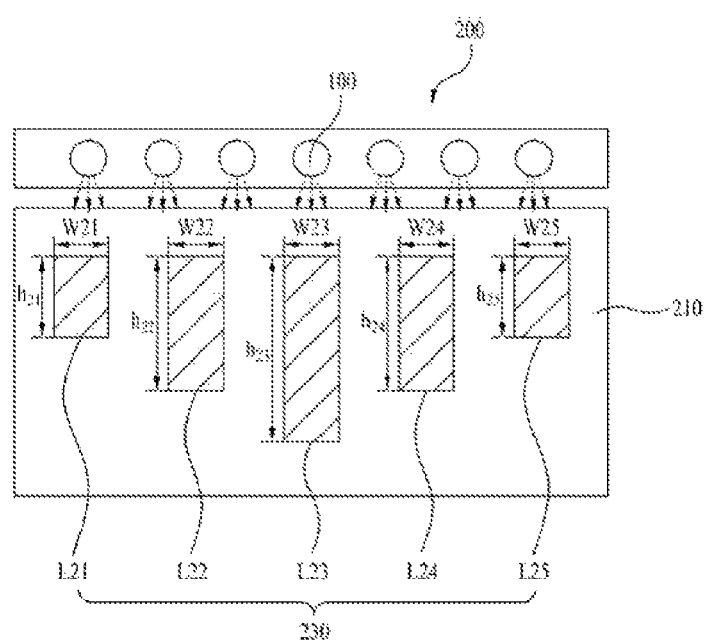

FIG. 3A is a view illustrating another embodiment of the backlight unit. The present embodiment is basically identical to the above-described embodiments, but has a difference in that a plurality of heat dissipating members 230 has different lengths.

More specifically, in the present embodiment, the heat dissipating member 230 disposed at the center of the frame 210 of the light emitting diode backlight unit has the greatest dimension. Here, the dimension corresponds to the length of the heat dissipating member 230.

Thus, the heat dissipating member 230 located at the center of the frame 210 has the greatest length and the length of the respective heat dissipating members 230 decreases toward the perimeter. Specifically, the length of the respective heat dissipating members 230 may gradually decrease toward the perimeter, i.e. toward the edge of the frame 210 in proportion to a distance from the center of the frame 210.

More specifically, the five heat dissipating members $L_{21}$, $L_{22}$, $L_{23}$, $L_{24}$ and $L_{25}$ have the same width $W_{21}$, $W_{22}$, $W_{23}$, $W_{24}$ and $W_{25}$, but have different heights (lengths) $h_{11}$, $h_{12}$, $h_{13}$, $h_{14}$ and $h_{15}$ respectively, such that the center heat dissipating member $L_{23}$ has the greatest length $h_{13}$ and the outermost heat dissipating members $L_{21}$ and $L_{25}$ have the smallest length $h_{11}$ and $h_{15}$.

In this case, the length $h_{11}$ of the outermost heat dissipating member may be in a range of ⅓~⅔ the length $h_{13}$ of the center heat dissipating member. If the length $h_{11}$ is less than ⅓ the length $h_{13}$, heat is not sufficiently dissipated at the perimeter. Also, if the length $h_{11}$ is ⅔ or more the width $h_{13}$, effects obtained by providing the center heat dissipating member with a long length are inconsequential.

Figure 3B:
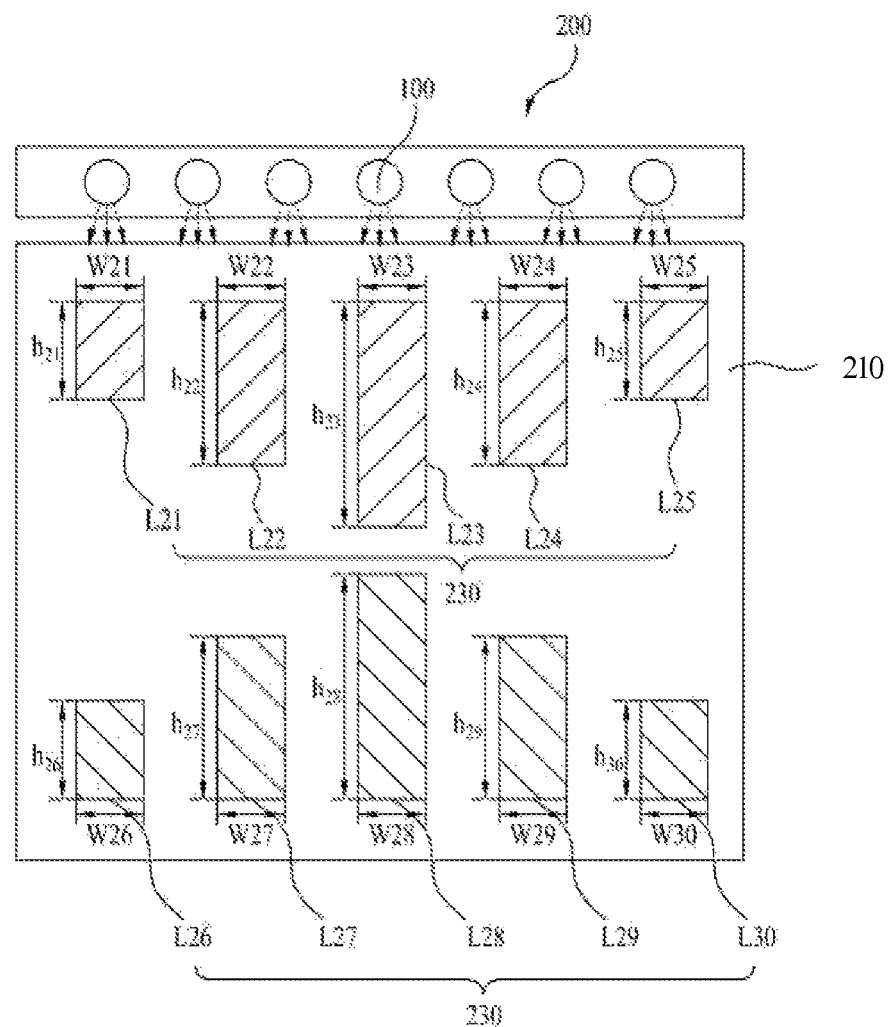

The embodiment illustrated in FIG. 3B is basically identical to the embodiment illustrated in FIG. 3A, but has a difference in that the heat dissipating members 230 are bundled into two symmetrical groups. Here, two groups, each consisting of the heat dissipating members $L_{21}$, $L_{22}$, $L_{23}$, $L_{24}$ and $L_{25}$, are symmetrically arranged on the basis of an imaginary line that bisects the frame 210 into upper and lower parts.

In the embodiments illustrated in FIGS. 2A, 2B and 3A, the heat dissipating members having the same area are horizontally symmetrically arranged on the basis of the center heat dissipating member.

As will be appreciated from a combination of the above-described embodiments, the length or width of the heat dissipating members may decrease toward the perimeter in proportion to a distance from the center of the frame 210.

In all the above-described embodiments, commonly, the heat dissipating member disposed at the center of the frame has the greatest area. That is, heat conductivity may be calculated by the following Equation 1.

$$Q = k\left(\frac{\Delta T}{L}\right) \qquad \text{Equation 1}$$

Here, Q represents heat flow, which is inversely proportional to the length L of a contact material and is proportional to a temperature variation $\Delta T$ of the material. Since increasing heat flow may necessitate to increase heat conductivity k of the heat dissipating member or the length of the contact material, the present embodiment proposes an increase in the area of the heat dissipating member so as to increase a contact length/area.

In addition, the heat dissipating members having the same size/shape may be densely arranged at the center of the frame and be less densely arranged toward the perimeter.

Figure 4A:
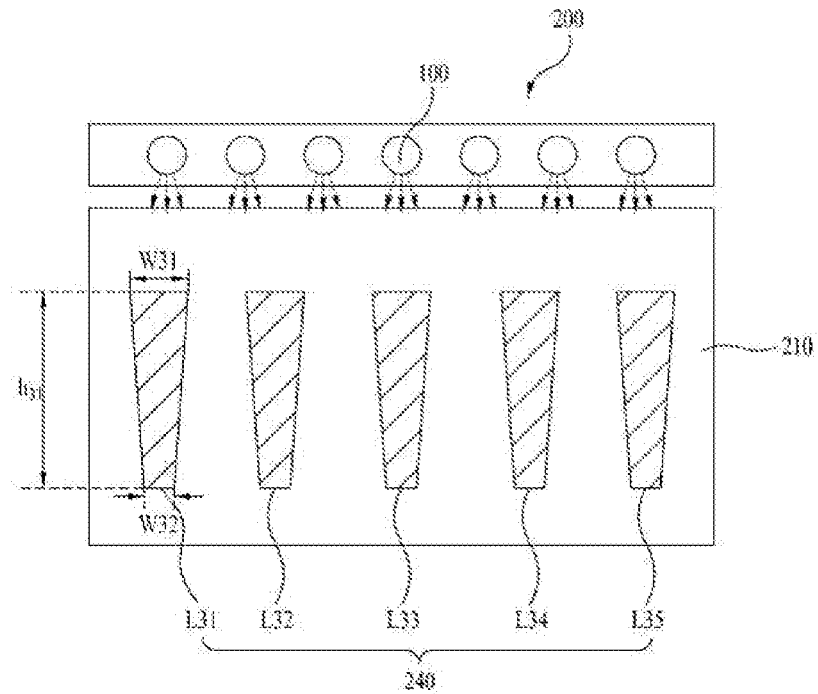
Figure 4B:
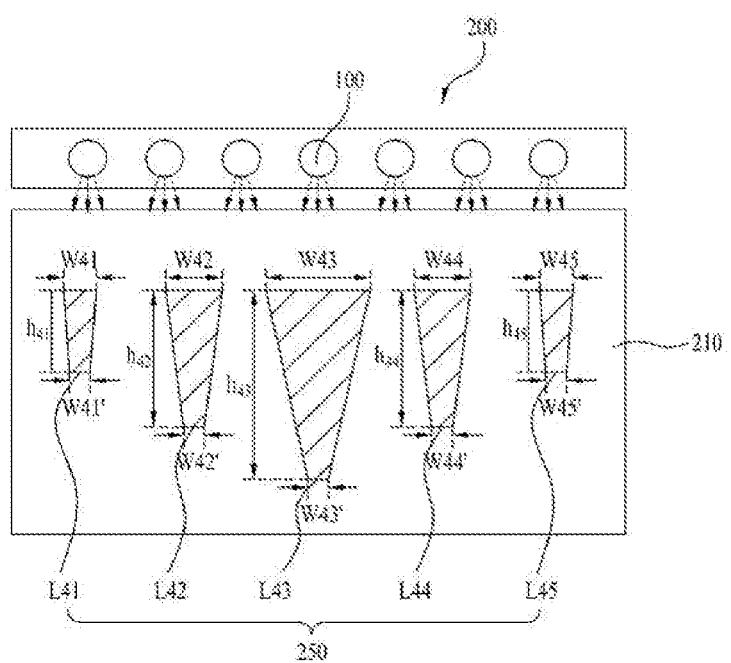

FIGS. 4A and 4B are views illustrating other embodiments of the backlight unit. These embodiments are basically identical to the above-described embodiments, but have a difference in that a plurality of heat dissipating members 240; $L_{31}$, $L_{32}$, $L_{33}$, $L_{34}$ and $L_{35}$ has a trapezoidal shape. More specifically, in the case of the trapezoidal heat dissipating member 240, one side thereof close to the light emitting diode package 100 has a greater width $W_{31}$ than the other end distant from the light emitting diode package 100.

More specifically, the heat dissipating member 240 as illustrated in FIG. 4A may be provided in consideration of the fact that heat is concentrated at locations closer to the light emitting diode package 100.

FIG. 4B is a view illustrating another embodiment of the backlight unit.

The present embodiment is basically identical to the above-described embodiment of FIG. 4A, but has a difference in that a plurality of trapezoidal heat dissipating members 250; $L_{41}$, $L_{42}$, $L_{43}$, $L_{44}$ and $L_{45}$ has different sizes. Here, of the respective trapezoidal heat dissipating members 250, the center heat dissipating member $L_{43}$ has the greatest area and the outermost heat dissipating members $L_{41}$ and $L_{45}$ have the smallest area.

Each of the heat dissipating members has the greatest width $W_{41}$, $W_{42}$, $W_{43}$, $W_{44}$ and $W_{45}$ at a portion thereof close to the light emitting diode package 100 and the width gradually decreases far away from the light emitting diode package 100 to $W_{41'}$, $W_{42'}$, $W_{43'}$, $W_{44'}$ and $W_{45'}$.

The respective heat dissipating members have different lengths (heights) $h_{41}$, $h_{42}$, $h_{43}$, $h_{44}$ and $h_{45}$. Specifically, the center heat dissipating member $L_{43}$ may have the greatest length $h_{43}$ and the outermost heat dissipating members $L_{41}$ and $L_{45}$ may have the smallest length $h_{41}$ and $h_{45}$.

In the above-described embodiments, the length of one of the heat dissipating members must be ⅓ or more the length of a shorter direction of the frame in order to achieve sufficient heat dissipation effects and is sufficient to be ⅔ or less the length of the shorter direction of the frame.

Preferably, the heat dissipating members have a thickness of 5 mm or less so as to enable production of an extremely slim backlight unit.

Figure 5:
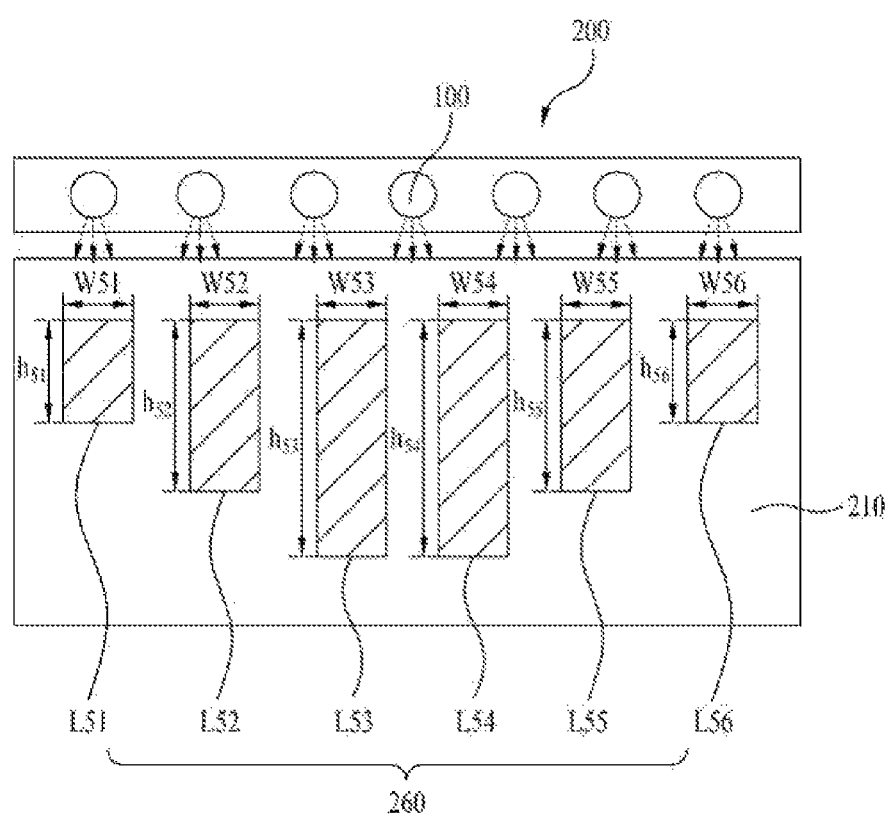

In the embodiment illustrated in FIG. 5, an even number of heat dissipating members 260 is disposed. Specifically, although one heat dissipating member disposed at the very middle of the frame 210 has the greatest area in the above-described embodiments, in the present embodiment, the even number of heat dissipating members 260 is disposed such that the two center heat dissipating members 260 have the same area.

Figure 6:
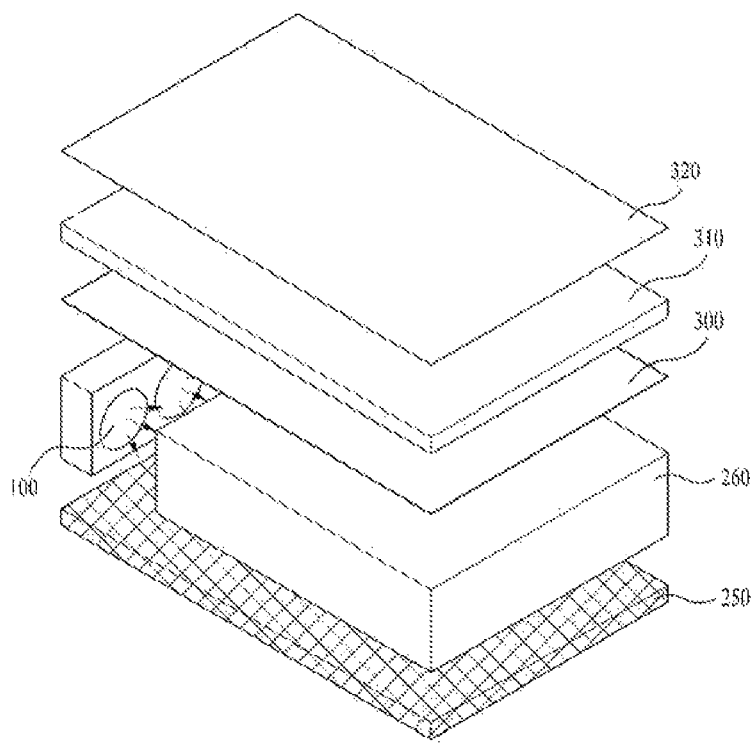
FIG. 6 is a view illustrating an embodiment of a display device having the backlight unit according to the embodiment.

FIG. 6 is a view illustrating an embodiment of a display device having the backlight unit according to the embodiment. Hereinafter, the embodiment of the display device having the backlight unit according to the embodiment will be described with reference to FIG. 6.

The display device according to the present embodiment includes the backlight unit, a diffusion plate 300, and a liquid crystal display member 310 and may further include a color filter 320.

The configuration of the backlight unit follows the above description. As illustrated, an array of the light emitting diode packages 100 (hereinafter, simply referred to as a light emitting device) is disposed on at least one surface of the frame.

Here, a light emitting diode consists of nitride semiconductors including a p-type semiconductor layer, an active layer and an n-type semiconductor layer stacked one above another on a substrate.

An n-type electrode and a p-type electrode of the light emitting diode are electrically connected to a mount lead and an inner lead respectively by use of wires. The light emitting diode is covered with a fluorescent layer that is made of a mixture of a transparent resin and a fluorescent material.

The light emitting diode is received in a cup-shaped structure, thereby enabling unidirectional emission of light.

The above-described backlight unit may include a reflective plate 270 and a light guide plate 280. The light guide plate 280 serves to disperse light emitted from the light emitting diode package 100 so as to allow the light to be uniformly distributed throughout a screen of the liquid crystal display. The reflective plate 270 serves to reintroduce the light exiting downward from the light guide plate 280 into the light guide plate 280 without any loss.

The frame of the backlight unit is disposed with heat dissipating members. Preferably, the heat dissipating member disposed at the center of the frame is larger than the heat dissipating member disposed at the perimeter of the frame.

Here, the size of the heat dissipating member may be determined based on any one of the width, length and area of the heat dissipating member. The heat dissipating member may have a trapezoidal shape gradually decreasing in width from a side thereof close to the light emitting device to an opposite side thereof distant from the light emitting device.

A coupling configuration of the frame and the heat dissipating members also follows the above description.

The diffusion plate 300, which serves as a lens, is placed on the light guide plate 280 so as to diffuse the light directed from the light guide plate 280 by a predetermined angle.

The liquid crystal display member 310 is placed on a front surface of the diffusion plate 300. Of course, other kinds of display members requiring a light emitting device other than the liquid crystal display member 310 may be disposed.

The liquid crystal display member 310 is configured such that liquid crystals are filled between glass substrates and a pair of polarizing plates is placed respectively on the glass substrates. Here, the liquid crystals are regularly arranged organic molecules having properties between solid and liquid and thus, having fluidity. The molecular arrangement of liquid crystals is changed by an exterior electric field, enabling display of an image.

The liquid crystal display member used in the display device is of an active matrix type and includes transistors serving as switches to control application of voltage to each pixel.

A detailed configuration of the liquid crystal display member is well known and thus, a description thereof will be omitted herein.

The color filter 320 may be placed on a front surface of the liquid crystal display member 310. The color filter 320 functions to display an image in such a manner that each pixel acts to transmit only red, blue or green light projected from the liquid crystal display member 310.

Since an edge type light emitting diode backlight unit is disposed at only some of four sides of the frame with light emitting diodes, distribution of heat emitted from the light emitting diodes may be concentrated at the center of the backlight unit. Thus, the center of the backlight unit requires a more efficient heat dissipating configuration than the edge of the backlight unit. An insufficient heat dissipating configuration may cause overheating of the center of the backlight unit and distortion of the frame and consequently, malfunction of the backlight unit or the display device.

As is apparent from the above description, in a backlight unit and a display device having the same according to the above-described embodiments, heat dissipating members in the form of heat pipes are arranged on a frame of the backlight unit such that the width of the respective heat dissipating members gradually decreases from the center to the perimeter of the backlight unit, thereby achieving efficient dissipation of heat concentrated at the center of the backlight unit.

Further, at least one of the width, length and area of these heat dissipating members may decrease or increase from the center to the perimeter of the backlight unit so as to effectively dissipate heat concentrated at the center of the backlight unit, whereby distortion of the frame and consequently, malfunction of the backlight unit and/or the display device can be prevented.

It will be apparent to those skilled in the art that various modifications and variations can be made in the embodiment without departing from the spirit or scope of the inventions.

Thus, it is intended that the embodiment covers the modifications and variations of this invention disposed they come within the scope of the appended claims and their equivalents.

What is claimed is:

1. A backlight unit comprising:
a light emitting device array;
an optical sheet configured to transmit light emitted from the light emitting device array;
a frame configured to support the light emitting device array and the optical sheet; and
at least two heat dissipating members disposed on the frame,
wherein an area of the heat dissipating member disposed at a center region is greater than that of the heat dissipating member disposed at a perimeter, and
wherein the at least two heat dissipating members are disposed to an emission direction of light from the light emitting device array.

2. The backlight unit according to claim 1, wherein the heat dissipating members include heat pipes.

3. The backlight unit according to claim 1, wherein a width of the heat dissipating member at the center is greater than that of the heat dissipating member at the perimeter.

4. The backlight unit according to claim 1, wherein a length of the heat dissipating member at the center is greater than that of the heat dissipating member at the perimeter.

5. The backlight unit according to claim 1, wherein the heat dissipating members have a trapezoidal shape such that a width of a side close to the light emitting device array is greater than that of an opposite side distant from the light emitting device array.

6. The backlight unit according to claim 5, wherein a width of the trapezoidal heat dissipating member disposed at the center is greater than that of the trapezoidal heat dissipating member disposed at the perimeter.

7. The backlight unit according to claim 5, wherein a length of the trapezoidal heat dissipating member disposed at the center is greater than that of the trapezoidal heat dissipating member disposed at the perimeter.

8. The backlight unit according to claim 1, wherein an area of the heat dissipating member at the center is greater than that of the heat dissipating member at the perimeter.

9. The backlight unit according to claim 1, wherein the heat dissipating members are disposed on a front surface or a rear surface of the frame.

10. The backlight unit according to claim 1, further comprising a light guide plate configured to transmit the light projected from the light emitting device array to the optical sheet.

11. A backlight unit comprising:
a light emitting device array including a plurality of light emitting devices;
a light guide plate and an optical sheet configured to transmit light emitted from the light emitting device array;
a frame configured to support the light emitting device array, the light guide plate and the optical sheet; and
at least two heat dissipating members placed on the frame in an emission direction of light from the light emitting device array,
wherein an area of the heat dissipating member disposed at the center is greater than that of the heat dissipating member disposed at the perimeter.

12. A backlight unit comprising:
light emitting device arrays disposed respectively at opposing sides;
an optical sheet configured to transmit light emitted from the light emitting device arrays;
a frame configured to support the light emitting device arrays and the optical sheet; and
two symmetric groups of heat dissipating members placed in an emission direction of light from the respective light emitting device arrays,
wherein an area of the heat dissipating member disposed at the center is greater than that of the heat dissipating member disposed at the perimeter.

13. The backlight unit according to claim 12, wherein each of the light emitting device arrays includes a plurality of light emitting devices and each group of heat dissipating members includes at least two heat dissipating members.

14. The backlight unit according to claim 12, wherein of the heat dissipating members of each group, a width of the heat dissipating member at the center is greater than that of the heat dissipating member at the perimeter.

15. The backlight unit according to claim 12, wherein of the heat dissipating members of each group, a length of the heat dissipating member at the center is greater than that of the heat dissipating member at the perimeter.

16. The backlight unit according to claim 12, wherein a width of the heat dissipating members of each group has a trapezoidal shape such that a side thereof close to the light emitting device array is greater than that of a side thereof distant from the light emitting device array.

17. The backlight unit according to claim 16, wherein a width of the trapezoidal heat dissipating member disposed at the center is greater than that of the trapezoidal heat dissipating member disposed at the perimeter.

18. The backlight unit according to claim 12, wherein of the heat dissipating members of each group, an area of the heat dissipating member at the center is greater than that of the heat dissipating member at the perimeter.

19. The backlight unit according to claim 12, wherein the heat dissipating members are disposed on a front surface or a rear surface of the frame.

20. The backlight unit according to claim 12, further comprising a light guide plate placed between the respective light emitting device arrays and serving to transmit the light emitted from the respective light emitting device arrays to the optical sheet.

* * * * *